United States Patent [19]

Kobayashi

[11] Patent Number: 5,300,609
[45] Date of Patent: Apr. 5, 1994

[54] FLUOROSILICONE BLOCK COPOLYMERS

[75] Inventor: Hideki Kobayashi, Chiba, Japan

[73] Assignee: Dow Corning Toray Silicon Co., Ltd., Tokyo, Japan

[21] Appl. No.: 28,846

[22] Filed: Mar. 10, 1993

[30] Foreign Application Priority Data

Mar. 31, 1992 [JP] Japan ................... 4-108961

[51] Int. Cl.$^5$ .............................. C08G 77/06
[52] U.S. Cl. ...................... 528/14; 528/18; 528/19; 528/21; 528/23; 528/31; 528/37; 528/42
[58] Field of Search ............. 528/37, 42, 18, 19, 528/31, 14, 21, 23

[56] References Cited

U.S. PATENT DOCUMENTS

| | | | |
|---|---|---|---|
| 3,337,497 | 8/1967 | Bostick | 528/37 |
| 3,481,898 | 12/1969 | Davies et al. | 528/37 |
| 3,974,120 | 8/1976 | Razzano | 260/30.4 SB |
| 4,814,418 | 3/1989 | Miyake et al. | 528/14 |

FOREIGN PATENT DOCUMENTS 50056 12/1992 Japan .

*Primary Examiner*—Melvyn I. Marquis
*Attorney, Agent, or Firm*—William F. Boley

[57] ABSTRACT

The present invention relates to novel fluorosilicone block copolymers and to a method for their preparation. More specifically, the present invention relates to fluorosilicone block copolymers that are composed of poly(perfluoroalkylmethylsiloxane) and polydimethylsiloxane chains and also to a method for the preparation of these fluorosilicone block copolymers.

3 Claims, No Drawings

FLUOROSILICONE BLOCK COPOLYMERS

BACKGROUND OF INVENTION

The present invention relates to novel fluorosilicone block copolymers and to a method for their preparation. More specifically, the present invention relates to fluorosilicone block copolymers that are composed of poly(perfluoroalkylmethylsiloxane) and polydimethylsiloxane chains and also to a method for the preparation of these fluorosilicone block copolymers.

Japanese Patent Publication (Kokoku) Number Sho 55-50056 (50,056/1980) discloses a polyorganosiloxane copolymer that is prepared by the polymerization of siloxane cyclics $(Me_2Si\ O)_x$ with the cyclic trisiloxane $(CF_3C_2H_4SiMeO)_3$ in the presence of potassium hydroxide; however, this polyorganosiloxane copolymer is a random copolymer. In addition, Japanese Patent Application Laid Open (Kokai) Number Sho 51-134796 (134,796/1976) discloses a method in which a mixture of the cyclic trisiloxane $(CF_3C_2H_4SiMeO)_3$ and the cyclic trisiloxane $(Me_2SiO)_x$ is copolymerized using alkyllithium catalyst. But here again, this method still does not afford an AB nor an ABA fluorosilicone block copolymer (A=poly(perfluoroalkylmethylsiloxane) chain, B=polydimethylsiloxane chain).

The present invention takes as its objects the introduction of novel AB and ABA fluorosilicone block copolymers in which A is a poly(perfluoroalkylmethylsiloxane) chain and B is a polydimethylsiloxane chain as well as the introduction of a method for the synthesis of these novel fluorosilicone block copolymers. A further object of the present invention is the introduction of a method for the preparation of fluorosilicone block copolymer whereby the fluorosilicone block copolymer is obtained by a one-pot synthesis from cyclic trisiloxanes.

The fluorosilicone block copolymers of the present invention as described herein are novel polymers with an AB or ABA fluorosilicone block copolymer structure in which A is the poly(perfluoroalkylmethylsiloxane) chain and B is the polydimethylsiloxane chain. These novel polymers are useful as compatibilizers for silicone rubber blends. For example, they are useful as compatibilizers in the preparation of dimethylsilicone rubber/fluorosilicone rubber mixtures, dimethylsilicone rubber/fluororubber mixtures, and fluorosilicone rubber/fluororubber mixtures.

SUMMARY OF INVENTION

The present invention relates to novel fluorosilicone block copolymers and to a method for their preparation. More specifically, the present invention relates to fluorosilicone block copolymers composed of poly(perfluoroalkylmethyl- siloxane) and polydimethylsiloxane chains and also to a method for the preparation of these fluorosilicone block copolymers.

DESCRIPTION OF INVENTION

The aforesaid objects are achieved by fluorosilicone block copolymers that are comprised of:

(a) a siloxane unit described by formula (B chain)

$(Me_2SiO)_x(MeQSiO)_z$, where Me represents a methyl group, Q represents an alkenyl group, x is an integer with a value of at least 40, and z is an integer with a value of zero or greater and (b) one or two siloxane unit described by formula (A chain)

$\{F(CF_2)_aC_2H_4SiMeO\}_y(MeQSiO)_v$, where a is an integer with a value of at least 1, y is an integer with a value of at least 40, and v is an integer with a value of zero or greater.

The aforesaid objects are also achieved by a method for the preparation of the above-described fluorosilicone block copolymers that comprises: (i) a first polymerization, in the presence of a catalyst selected from a group consisting of alkyllithium catalysts and lithium silanolate catalysts, of a cyclic trisiloxane described by formula (1)

$(Me_2SiO)_3$   (Me=methyl)

or a mixture of cyclic trisiloxane (1) and a cyclic trisiloxane described by formula (2)

$(MeQSiO)_3$   (Me=methyl)

until the disappearance of the cyclic trisiloxanes, and (ii) a second polymerization after the addition of cyclic trisiloxane described by formula (3)

$\{F(CF_2)_aC_2H_4$—$SiMeO\}_3$ (Me=methyl)

or a mixture of cyclic trisiloxane (3) and cyclic trisiloxane (2).

The fluorosilicone block copolymer of the present invention is an AB or ABA fluorosilicone block copolymer in which the B chain is described by formula (a)

$(Me_2SiO)_x(MeQSiO)_z$, where Me represents a methyl group, Q represents an alkenyl group, x is an integer with a value of at least 40, and z is an integer with a value of zero or greater and the A chain is described by formula (b)

$\{F(CF_2)_aC_2H_4SiMeO\}_y(MeQSiO)_v$, where a is an integer with a value of at least 1, y is an integer with a value of at least 40, and v is an integer with a value of zero or greater.

The group Q is an alkenyl and is exemplified by vinyl, allyl, hexenyl, and so forth. Since the B chain described by formula (a) contains at least 40 siloxane units, (x+z) will be at least 40. With regard to the siloxane unit MeQSiO, when z is not zero this unit may be dispersed among the $Me_2SiO$ units that principally comprise the B chain or this unit may be present in block form.

Since the A chain described by formula (b) contains at least 40 siloxane units, (v+y) will be at least 40. The subscript a in the preceding formula is an integer with a value of at least 1, but as a general rule should not exceed 10. The subscript a is particularly exemplified by 1, 4, and 6.

The fluorosilicone block copolymer of the present invention is an AB or ABA fluorosilicone block copolymer. In particular, y in the block copolymer is 20 to 80 mole percent based on the sum (x+y+z+v), and preferably at least 2 functional groups Q are present.

The fluorosilicone block copolymer of the present invention is synthesized by first polymerizing cyclic trisiloxane described by formula (1)

$(Me_2SiO)_3$ alone or in mixture with cyclic trisiloxane described by formula (2)

$(MeQSiO)_3$ until disappearance of the cyclic trisiloxanes. This polymerization is carried out in the presence of a catalyst selected from a group consisting of alkyllithium catalysts and lithium silanolate catalysts. This first polymerization is followed by a second polymerization after the addition of cyclic trisiloxane described by formula (3)

$\{F(CF_2)_aC_2H_4—SiMeO\}_3$ alone or in mixture with the cyclic trisiloxane (MeQSiO)$_3$.

Anhydrous conditions are preferred in the polymerization device, for example, by the use of preliminarily dried nitrogen gas. The charge to the polyinerizatioll device will consist of the cyclic trisiloxane (Me$_2$SiO)$_3$ alone, or a mixture of the cyclic trisiloxane (Me$_2$SiO)$_3$ and the cyclic trisiloxane (MeQSiO)$_3$, or the corresponding organic solvent solutions.

Polymerization is then initiated by the addition of a solution of alkyllithium catalyst. The commercially available alkyllithium catalysts are suitable for application here, and among these the commercially available ether and hexane solutions are generally suitable. The alkyllithium catalyst itself is nonexhaustively exemplified by n- butyllithium, tert-butyllithium, and methyllithium. When an alkyllithilim catalyst solution is used, an AB fluorosilicone block copolymer is ultimately obtained because one terminal is endblocked by RMe$_2$SiO or RMeQSiO (R=alkyl). An AB fluorosilicone block copolymer is also obtained for the use of lithium trialkylsilanolate as catalyst due to the generation of a terminal endblocked by trialkylsiloxy. On the other hand, when a lithium silanolate described by formula (4)

$Lio(Me_2SiO)_nLi$ (n is a positive integer) is used as catalyst, polymerization develops at both terminals and an ABA fluorosilicone block copolymer is ultimately obtained. With regard to the final termination of the polymerization process, these two terminals of the ABA fluorosilicone block copolymer may be left as silanol groups through the simple addition of acid or they may be endblocked by neutralization with trialkylchlorosilane.

The Me group in formula (4) may be replaced in part by a Q group as desired. Lithium silanolate described by formula (4) is readily produced, for example, by the addition of a solution of alkyllithium catalyst to the corresponding polysiloxane-alpha,omega-diol with liberation of alkane. This catalyst may be added to the polymerization device that has already been charged with the cyclic trisiloxane, or it can first be synthesized in the polymerization device followed by addition of the cyclic trisiloxane.

The first polymerization is run with stirring at ambient temperature to 150° C. until the disappearance of cyclic trisiloxane. Polymerization is generally run for 30 minutes to 1 day. In the case of use of an organic solvent, the organic solvent can be selected, for example, from a group consisting of toluene, hexane, heptane, and tetrahydrofuran. Suitable cyclic trisiloxane concentrations are 10 to 80 weight percent.

The use is preferred of a polymerization promoter selected from a group consisting of dimethylformamide, dimethyl sulfoxide, and dimethylacetamide. Suitable quantities of addition for the polymerization promoter are typically 0.1 to 30 weight percent based on the amount of cyclic trisiloxane.

The B moiety of the fluorosilicone block copolymer is synthesized by polymerization as described above of cyclic trisiloxane (1) alone or in mixture with cyclic trisiloxane (2) until the cyclic trisiloxane has been consumed.

This is followed by the addition of cyclic trisiloxane (3) i.e. $\{F(CF_2)_aC_2H_4—SiMeO\}_3$, alone or in mixture with cyclic trisiloxane (2). The A moiety of the fluorosilicone block copolymer is then developed by polymerization from the terminal(s) of the B moiety in order thereby to synthesize the AB or ABA fluorosilicone block copolymer.

Because cyclic trisiloxane (3) generally has a faster polymerization rate in the preparative method of the present invention than cyclic trisiloxane (1), this polymerization is run for 5 minutes to 2 hours at 0° C. to 100° C. It is not necessary in this step to run polymerization until disappearance of the cyclic trisiloxane.

Polymerization of the AB or ABA fluorosilicone block copolymer is terminated by neutralization of the catalyst by the rapid addition of acid. The AB or ABA fluorosilicone block copolymer is recovered by stripping off any solvent used and unreacted cyclic trisiloxane in a vacuum.

The following examples are provided to illustrate the present invention. These examples are not intended to limit the claims herein.

EXAMPLE 1

Anhydrous conditions were first established in a flask by blowing in dry nitrogen. The flask was then charged with 0.27 dimethylsiloxanediol (hydroxyl content=15 weight percent) and 20 g preliminarily dried toluene. This was followed by the addition of 1.5 mL (2.4 millimole) hexane solution of n-butyllithium (concentration=1.6 mole/L) by a syringe technique. The evolution of heat and gas was observed. After the addition of 3 g N,N- dimethylformamide, a preliminarily dried mixture of 300 g (Me$_2$SiO)$_3$, 1 g (MeViSiO)$_3$ (Vi=vinyl) and 300 g toluene was dripped in over 2 hours. After stirring for 12 hours at room temperature, the disappearance of both cyclic trisiloxanes was confirmed by gas chromatography (GLC). The reaction product was put in solution in 1,1,2-trichlorotrifluoroethane and was analyzed by gel permeation chromatography (GPC) using a polydimethylsiloxane standard. It was found that the obtained polymer had a weight-average molecular weight of 189,000, a number-average molecular weight of 118,000, and a dispersity of 1.6. Oligomeric by-products were not observed.

A mixture of 635.8 g (CF$_3$CH$_2$CH$_2$SiMeO)$_3$, 1 g (MeViSiO)$_3$ and 300 g toluene was then added and the reaction system was stirred at high speed at room temperature. A white turbidity was seen after 2 minutes. After 10 minutes the reaction system had thickened and again become transparent and after 15 minutes the reaction system had reached a gum-like state. Dry ice was then added in order to terminate the reaction. This reaction product was analyzed by GPC with the following results: 95% was polymer with a weight-average molecular weight of 1,040,000 and a number-average molecular weight of 400,000, and the remaining 5% was oligomer with a molecular weight of 300. A gum was obtained by stripping this reaction product for 6 hours in a vacuum at 150° C. Analysis by $^{29}$Si NMR demonstrated the Me$_2$SiO unit peak at $-22.0$ ppm and the CF$_3$CH$_2$CH$_2$SiMeO unit peak at $-19.6$ ppm at an integration ratio of 1:1.

Based on the results of the GPC and $^{29}$Si NMR analyses, this fluorosilicone block copolymer was confirmed to be a fluorosilicone block copolymer with the following compositional formula.

(Me$_2$SiO)$_{1600}$(CF$_3$CH$_2$CH$_2$SiMeO)$_{1600}$(MeViSiO)$_{10}$

EXAMPLE 2

A reaction was run as in Example 1, but in this case using heptane in place of the toluene used in Example 1 and adding 612 g (2 mole) cyclic trisiloxane with the formula (C$_4$F$_9$CH$_2$SiMeO)$_3$ in place of the 635.8 g (CF$_3$CH$_2$CH$_2$SiMeO)$_2$ used in Example 1. Disappearance of the polydimethylsiloxane polymer (weight-average molecular weight=189,000, number-average molecular weight=118,000, dispersity=1.6) was observed. GPC measurement gave a weight-average molecular weight of 860,000. Analysis by $^{29}$Si NMR demonstrated the Me$_2$SiO unit peak at $-22.0$ ppm and the C$_4$F$_9$CH$_2$CH$_2$SiMeO unit peak at $-21.6$ ppm at an integration ratio of 2:1. The results of these analyses demonstrated that this method had produced a gum-like fluorosilicone block copolymer. This fluorosilicone block copolymer was confirmed to be a fluorosilicone block copolymer with the following compositional formula.

(Me$_2$SiO)$_{1600}$(C$_4$F$_9$C$_2$H$_4$SiMeO)$_{800}$(MeViSiO)$_{10}$

EXAMPLE 3

After first establishing anhydrous conditions in a flask by blowing in dry nitrogen, a preliminarily dried mixture of 300 g (Me$_2$SiO)$_3$ and 300 g toluene was introduced. 1 g dimethyl sulfoxide was then added followed by the addition of 1.5 mL (2.4 millimole) hexane solution of n-butyllithium (concentration=1.6 mole/L) by a syringe technique. After stirring for 9 hours at room temperature, disappearance of the cyclic trisiloxane was confirmed by GLC. GPC measurement demonstrated the synthesis of a polymer with a weight-average molecular weight of 120,000 and a dispersity of 1.2. Oligomeric secondary products were not observed. A mixture of 635 g (CF$_3$CH$_2$CH$_2$SiMeO)$_3$ and 300 g toluene was then added, and the reaction system was stirred at high speed at room temperature. The reaction system had assumed a gum-like state after 15 minutes, and the reaction was then terminated by the addition of dry ice. Stripping in a vacuum for 6 hours at 150° C. yielded a gum-like fluorosilicone block copolymer. This fluorosilicone block copolymer was confirmed to be a fluorosilicone block copolymer with the following compositional formula.

(Me$_2$SiO)$_{1600}$(CF$_3$CH$_2$CH$_2$SiMeO)$_{1600}$

I claim:

1. A fluorosilicone block copolymer comprised of
(a) a siloxane unit described by formula (Me$_2$SiO)$_x$(MeQSiO)$_z$, where Me represents a methyl group, Q represents an alkenyl group, x is an integer with a value of at least 40, and z is an integer with a value of zero or greater and (b) one or two siloxane units described by formula {F(CF$_2$)$_a$C$_2$H$_4$SiMeO}$_y$(MeQSiO)$_v$, where a is an integer with a value of at least 1, y is an integer with a value of at least 40, and v is an integer with a value of zero or greater.

2. The fluorosilicone block copolymer of claim 1, where y is 20 to 80 mole percent based on the sum (x+y+z+v) and that contains at least 2 Q groups in each molecule.

3. The fluorosilicone block copolymer of claim 1, where a is one, four, or six.

* * * * *